(12) United States Patent
Yamazaki et al.

(10) Patent No.: US 12,103,405 B2
(45) Date of Patent: Oct. 1, 2024

(54) POWER DISTRIBUTION APPARATUS FOR ELECTRIC VEHICLE

(71) Applicant: SUBARU CORPORATION, Tokyo (JP)

(72) Inventors: Yoshinobu Yamazaki, Tokyo (JP); Masami Oguri, Tokyo (JP); Akihiro Nabeshima, Tokyo (JP); Yoshiyuki Jin, Tokyo (JP); Takeshi Yoneda, Tokyo (JP); Fumiya Sato, Tokyo (JP); Hiroshi Kusano, Tokyo (JP); Keigo Yamada, Tokyo (JP); Takumi Araki, Tokyo (JP); Shuntaro Miura, Tokyo (JP); Susumu Ito, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 33 days.

(21) Appl. No.: 18/116,947

(22) Filed: Mar. 3, 2023

(65) Prior Publication Data

US 2023/0294525 A1    Sep. 21, 2023

(30) Foreign Application Priority Data

Mar. 18, 2022    (JP) .................................. 2022-043462

(51) Int. Cl.
*B60W 30/18* (2012.01)
*B60L 15/20* (2006.01)
*B60L 50/60* (2019.01)

(52) U.S. Cl.
CPC ........... *B60L 50/60* (2019.02); *B60L 15/2009* (2013.01); *B60W 30/18127* (2013.01); *B60L 2240/12* (2013.01); *B60L 2240/423* (2013.01)

(58) Field of Classification Search
CPC .. B60L 50/60; B60L 15/2009; B60L 2240/12; B60L 2240/423; B60W 30/18127
USPC ......................................................... 307/10.1
See application file for complete search history.

(56) References Cited

U.S. PATENT DOCUMENTS 11,465,624 B2 * 10/2022 Lee .................. B60W 30/0956
2021/0140496 A1 * 5/2021 Watanabe ............... F16D 21/00
2021/0229646 A1 * 7/2021 Kim ...................... B60T 8/3215

FOREIGN PATENT DOCUMENTS

JP         2010-149745 A    7/2010

* cited by examiner

*Primary Examiner* — Michael R. Fin
(74) *Attorney, Agent, or Firm* — TROUTMAN PEPPER HAMILTON SANDERS LLP

(57) ABSTRACT

A power distribution apparatus for an electric vehicle includes a power distribution mechanism configured to distribute power output from an electric motor to front and rear wheels, and a controller configured to control the power distribution mechanism. The power distribution mechanism includes a first clutch configured to fix a power distribution ratio during straight traveling to a first distribution ratio at which first power distributed to the rear wheels and second power distributed to the front wheels are nearly same, and a second clutch configured to fix the power distribution ratio during straight traveling to a second distribution ratio at which the first power is larger than the second power. The controller is configured set the second clutch to an engaged state and sets the first clutch to a half-engaged state during regenerative braking.

12 Claims, 4 Drawing Sheets

POWER DISTRIBUTION APPARATUS FOR ELECTRIC VEHICLE

CROSS-REFERENCE TO RELATED APPLICATION

The present application claims priority from Japanese Patent Application No. 2022-043462 filed on Mar. 18, 2022, the entire contents of which are hereby incorporated by reference.

BACKGROUND

The disclosure relates to a power distribution apparatus for an electric vehicle.

It is described in Japanese Unexamined Patent Application Publication (JP-A) No. 2010-149745 that regenerative braking is performed in an electric vehicle provided with a power distribution mechanism for transmitting power to front wheels and rear wheels.

SUMMARY

An aspect of the disclosure provides a power distribution apparatus for an electric vehicle. The electric vehicle includes front wheels, rear wheels, an electric motor configured to output power for traveling, and a mechanical brake configured to apply a braking force to at least the front wheels. The power distribution apparatus includes a power distribution mechanism configured to distribute the power output from the electric motor to the front wheels and the rear wheels, and a controller configured to control the power distribution mechanism. The power distribution mechanism includes a first clutch configured to fix a power distribution ratio during straight traveling of the vehicle to a first distribution ratio, and a second clutch configured to fix the power distribution ratio during the straight traveling to a second distribution ratio. The second distribution ratio is a distribution ratio at which first power distributed to the rear wheels is larger than second power distributed to the front wheels. The first distribution ratio is a distribution ratio at which the first power and the second power are nearly equal as compared to when at the second distribution ratio. The controller is configured to set the second clutch to an engaged state and sets the first clutch to a half-engaged state during regenerative braking of the electric vehicle.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

A vehicle can behave well during traveling when a power distribution mechanism distributes power larger than power for front wheels to rear wheels. On the other hand, when regenerative braking is performed in a vehicle provided with the power distribution mechanism, a braking force for the rear wheels becomes larger than a braking force for the front wheels, and an ideal distribution ratio of the braking force is not obtained.

It is desirable to provide a power distribution apparatus for an electric vehicle that is capable of distributing power larger than power for front wheels to rear wheels and that is capable of achieving a stable vehicle behavior during braking.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. In the present embodiment, a state where a clutch transmits a substantially 100% torque is referred to as an engaged state, and a state where the clutch transmits substantially no torque is referred to as a released state. Further, a state where the clutch transmits a torque while slipping is referred to as a half-engaged state.

Figure 1:
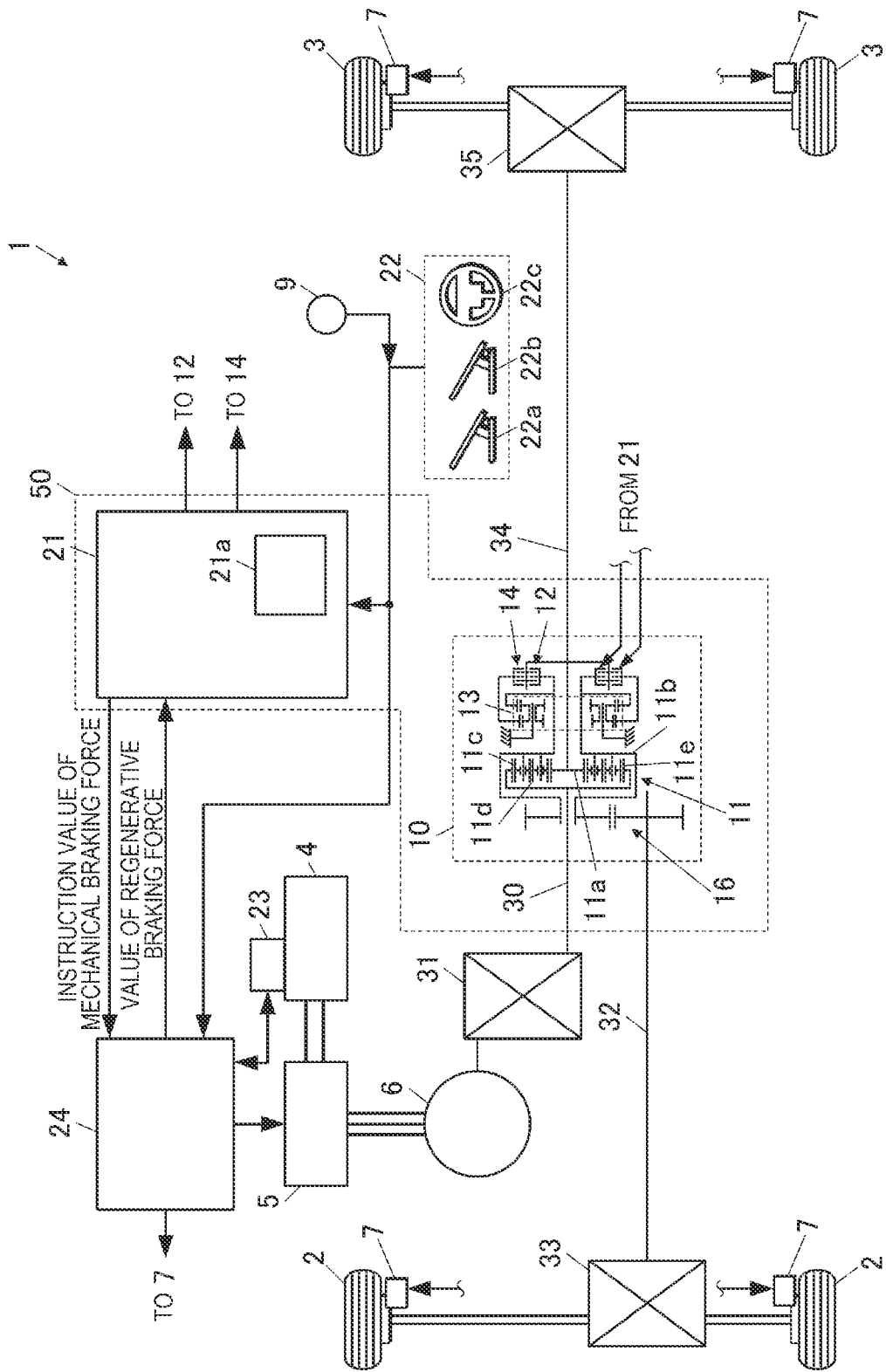
FIG. 1 is a configuration diagram illustrating an electric vehicle provided with a power distribution apparatus according to an embodiment of the disclosure.

FIG. 1 is a configuration diagram illustrating an electric vehicle provided with a power distribution apparatus according to the embodiment of the disclosure. An electric vehicle 1 according to the embodiment includes front wheels 2, rear wheels 3, an electric motor 6, a battery 4 that stores electric power for traveling, an inverter 5 that drives the electric motor 6, a power distribution mechanism 10 that distributes power of the electric motor 6 to the front wheels 2 and the rear wheels 3, and mechanical brakes 7 that apply braking forces to the front wheels 2 and the rear wheels 3.

The inverter 5 operates the electric motor 6 by transmitting electric power between the electric motor 6 and the battery 4. The inverter 5 causes the electric motor 6 to perform a power running operation, so that power is output from the electric motor 6. When the inverter 5 causes the electric motor 6 to perform a regenerative operation, the electric motor 6 generates electric power, and a regenerative braking torque is generated on a motor shaft of the electric motor 6. The power and the regenerative braking torque are transmitted to the front wheels 2 and the rear wheels 3 via the power distribution mechanism 10. The description "during regenerative braking" according to the disclosure corresponds to a period during which a braking force (regenerative braking force) resulting from the regenerative braking torque is applied. Even when the braking forces (mechanical braking forces) generated by the mechanical brakes 7 are applied, if the regenerative braking force is also applied at the same time, this case corresponds to the period during which regenerative braking is performed.

The mechanical brakes 7 generate frictional forces so as to apply braking forces to the front wheels 2 and the rear wheels 3. In detail, the mechanical brakes 7 generate frictional forces on a mechanism (such as a disc rotor) coupled to the front wheels 2 and a mechanism (such as a disc rotor)

coupled to the rear wheels 3. Alternatively, the mechanical brakes 7 may generate frictional forces on a side closer to the front wheels 2 and a side closer to the rear wheels 3 of a power transmission path with respect to the power distribution mechanism 10. The frictional forces may be generated using a hydraulic pressure, and may be generated using other power.

The electric vehicle 1 further includes a controller 21 that controls the power distribution mechanism 10, a driving operation unit 22, a battery management unit 23, a traveling control unit 24 that controls the inverter 5 and the mechanical brakes 7, and a sensor 9 that detects a vehicle state including a vehicle speed. The power distribution mechanism 10 and the controller 21 correspond to a power distribution apparatus 50 according to the embodiment.

The driving operation unit 22 includes an accelerator operation unit 22a, a brake operation unit 22b, and a steering unit 22c that are operated by a driver. As signals for a driving operation, a signal showing an operation amount of the accelerator operation unit 22a and a signal showing an operation amount of the brake operation unit 22b are transmitted to the traveling control unit 24 and the controller 21. The signals for a driving operation may be transmitted from an automatic driving system to the traveling control unit 24 and the controller 21. The controller 21 may receive a signal value for a driving operation from the traveling control unit 24. A value for a vehicle state detected by the sensor 9 is also transmitted to the traveling control unit 24 and the controller 21 in the same manner as the signals for a driving operation.

The traveling control unit 24 can output power to the front wheels 2 and the rear wheels 3 by causing the inverter 5 to perform the power running operation. The traveling control unit 24 can apply the braking forces to the front wheels 2 and the rear wheels 3 by causing the inverter 5 to perform the regenerative operation and operating the mechanical brakes 7. The traveling control unit 24 executes control on the output of the power based on the driving operation and the vehicle state (such as the vehicle speed). The traveling control unit 24 executes control on the braking forces based on the driving operation, the vehicle state (such as the vehicle speed), a state of the battery 4, and an instruction value of the mechanical braking forces from the controller 21.

The controller 21 can switch a first clutch 12 and a second clutch 14, which will be described later, to an engaged state, a half-engaged state, and a released state by operating a hydraulic circuit or an electric actuator. The controller 21 can control the mechanical brakes 7 by outputting the instruction value of the mechanical braking forces to the traveling control unit 24. The controller 21 can read a value of the regenerative braking force at that time from the traveling control unit 24.

The controller 21 includes one electronic control unit (ECU) or ECUs that communicate with each other and that operate in conjunction with each other. The controller 21 includes a storage 21a that stores a control program and control data, and executes the control program stored in the storage 21a. The traveling control unit 24 includes one ECU or ECUs that communicate with each other and that operate in conjunction with each other. The controller 21 and the traveling control unit 24 communicate with each other and operate in conjunction with each other. The controller 21 and the traveling control unit 24 may be integrated with each other and provided in a common ECU.

The power distribution mechanism 10 is provided among a drive shaft 30 to which power is transmitted from the electric motor 6, a front transmission shaft 32 that transmits power to the front wheels 2, and a rear transmission shaft 34 that transmits power to the rear wheels 3. The front transmission shaft 32 transmits power to the front wheels 2 via a gear mechanism 33 including a differential mechanism. The rear transmission shaft 34 transmits power to the rear wheels 3 via a gear mechanism 35 including a differential mechanism. A power transmission mechanism 31 including any one or more of a transmission mechanism, a gear mechanism, a clutch and the like, which are not illustrated, may be interposed between the electric motor 6 and the drive shaft 30.

The power distribution mechanism 10 includes a differential mechanism 11 capable of transmitting power without restricting a rotational speed difference between the front wheels 2 and the rear wheels 3, the first clutch 12 capable of fixing a power distribution ratio between the front wheels 2 and the rear wheels 3 during straight traveling to a first distribution ratio, and the second clutch 14 capable of fixing a power distribution ratio between the front wheels 2 and the rear wheels 3 during straight traveling to a second distribution ratio. The differential mechanism 11 includes three rotation elements, and the first clutch 12 and the second clutch 14 can achieve the functions described above by coupling two of the three rotation elements or connecting two of the three rotation elements via a gear mechanism.

As an example, the differential mechanism 11 may be a planetary gear mechanism that includes a sun gear 11a coupled to the rear transmission shaft 34, a planetary carrier 11d connected to the front transmission shaft 32 via a gear mechanism 16, an internal gear 11e coupled to the drive shaft 30, and planetary gears 11b and 11c provided between the sun gear 11a and the internal gear 11e. The planetary gears 11b and 11c may be a two-stage configuration in which the planetary gear 11b located inward in a radial direction and the planetary gear 11c located outward in the radial direction mesh with each other.

In the case of the above configuration of the differential mechanism 11, the first clutch 12 can be implemented by a configuration capable of coupling the sun gear 11a and the planetary carrier 11d to each other. In the case of the above configuration of the differential mechanism 11, the second clutch 14 can be implemented by a configuration in which the sun gear 11a and the planetary carrier 11d can be connected to each other via a gear mechanism 13.

The power distribution mechanism 10 distributes power to the front wheels 2 and the rear wheels 3 in the following distribution ratio according to states of the first clutch 12 and the second clutch 14. Hereinafter, a distribution ratio of power for the front wheels 2 to power for the rear wheels 3 is referred to as a "front-rear power distribution ratio".

A. When the first clutch 12 and the second clutch 14 are in the released state

The front-rear power distribution ratio=50:50, and a rotational speed difference between the front wheels 2 and the rear wheels 3 is not restricted.

B. When the first clutch 12 is in the engaged state and the second clutch 14 is in the released state.

The front-rear power distribution ratio=50:50 (=first distribution ratio), and the rotational speed difference between the front wheels 2 and the rear wheels 3 is restricted in a constant ratio.

C. When the first clutch 12 is in the released state and the second clutch 14 is in the engaged state The front-rear power distribution ratio=40:60 (=second distribution ratio), and the rotational speed difference between the front wheels 2 and the rear wheels 3 is restricted in a constant ratio.

However, the distribution ratios of the cases B and C are limited to the straight traveling.

The first distribution ratio and the second distribution ratio are not limited to the above examples. At the second distribution ratio, a ratio of the power distributed to the rear wheels may be larger. The first distribution ratio may be a distribution ratio at which the power for the rear wheels and the power for the front wheels are not completely equal but are nearly equal as compared to when at the second distribution ratio.

The above power distribution ratios can be implemented by the following configurations. That is, the distribution ratio of the case A can be implemented by setting gear ratios of the differential mechanism 11. The distribution ratio (first distribution ratio) of the case B can be implemented by setting a gear ratio of the power transmission path such that, in the case where the first clutch 12 is in the engaged state, a deceleration ratio from the drive shaft 30 to the front wheels 2 and a deceleration ratio from the drive shaft 30 to the rear wheels 3 are the same. The distribution ratio (second distribution ratio) of the case C can be implemented by setting a gear ratio of the power transmission path such that, in the case where the second clutch 14 is in the engaged state, the deceleration ratio from the drive shaft 30 to the front wheels 2 is slightly larger than the deceleration ratio from the drive shaft 30 to the rear wheels 3.

The setting of the gear ratios may be described as follows.

A deceleration ratio from the second clutch 14 to the front wheels 2>a deceleration ratio from the second clutch 14 to the rear wheels 3

A deceleration ratio from the first clutch 12 to the front wheels 2≈a deceleration ratio from the first clutch 12 to the rear wheels 3

According to the above setting of the gear ratios, when the first clutch 12 is in the engaged state and the second clutch 14 is in the released state, if the power is transmitted in a state where the front wheels 2 and the rear wheels 3 are away from the ground, the front wheels 2 and the rear wheels 3 rotate at the same rotational speed, and the power is transmitted equally to the front wheels 2 and the rear wheels 3. In this case, it is assumed that the left and right front wheels 2 rotate at the same speed, and the left and right rear wheels 3 rotate at the same speed.

On the other hand, when the first clutch 12 is in the released state and the second clutch 14 is in the engaged state, if the power is transmitted in the state where the front wheels 2 and the rear wheels 3 are away from the ground, the rotational speed of the rear wheels 3 is slightly higher (for example, +3%) than the rotational speed of the front wheels 2. Therefore, more power is distributed to the rear wheels 3 than to the front wheels 2 during the straight traveling. In this case, it is assumed that the left and right front wheels 2 rotate at the same speed, and the left and right rear wheels 3 rotate at the same speed.

Figure 2:
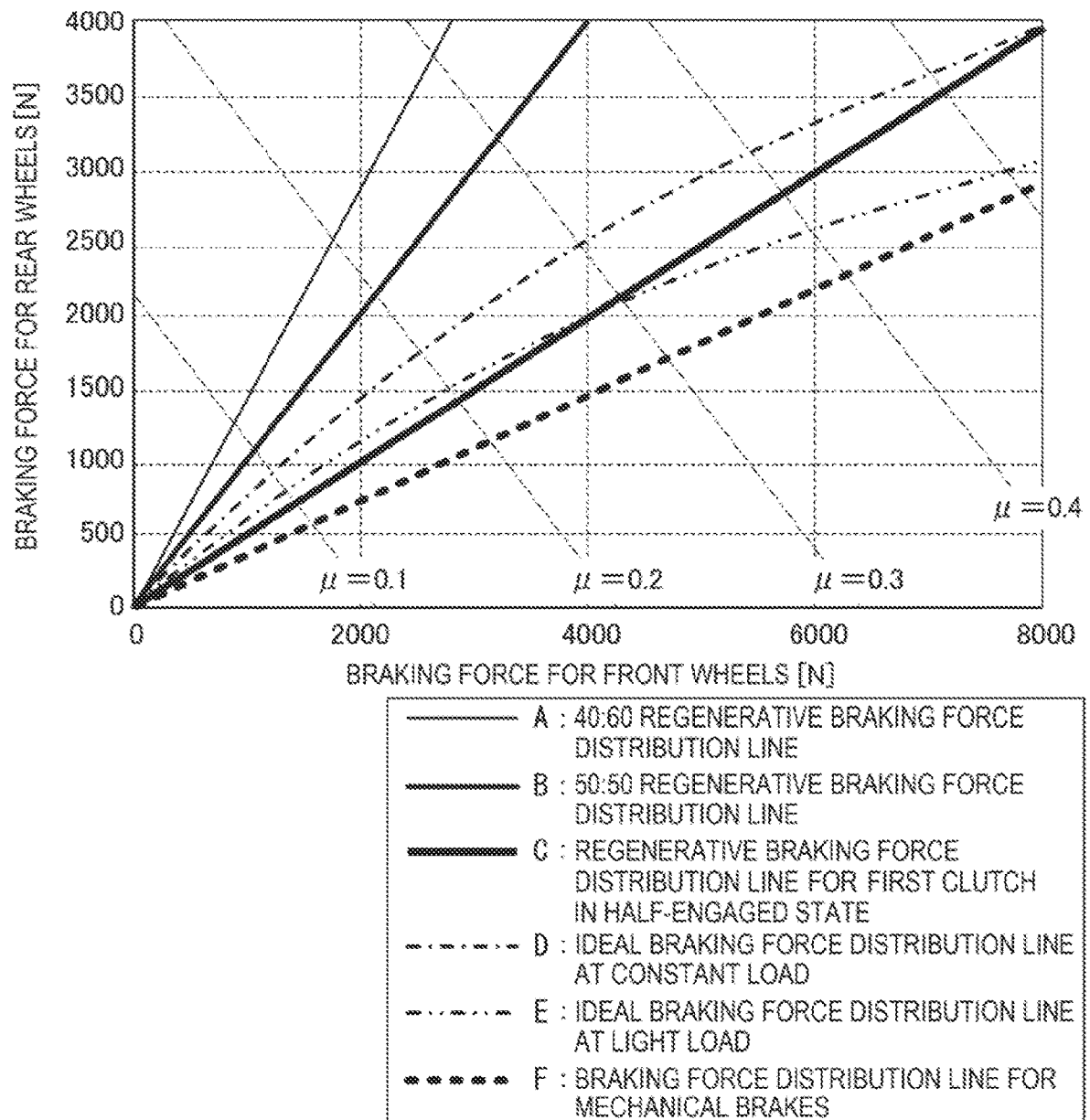
FIG. 2 is a braking force distribution line diagram illustrating a ratio between a braking force for front wheels and a braking force for rear wheels.

FIG. 2 is a braking force distribution line diagram illustrating a ratio between the braking force for the front wheels and the braking force for the rear wheels.

In FIG. 2, characteristic lines D and E respectively indicate an ideal braking force distribution line at a constant load through which a stable braking behavior at a maximum vehicle weight can be attained and an ideal braking force distribution line at a light load through which a stable braking behavior at a vehicle weight in a lightest state (a state where only a driver who drives the vehicle gets in) can be attained. The ideal braking force distribution line at the constant load and the ideal braking force distribution line at the light load are generally known ideal braking force distribution lines. A stable vehicle behavior during braking can be attained by distributing the braking forces according to the braking force distribution lines.

A characteristic line A indicates a braking force distribution line in the case where the front-rear power distribution ratio is 40:60, where the regenerative braking occurs, and where the mechanical brakes 7 are released. Since the regenerative braking force is distributed according to a radio equal to the front-rear power distribution ratio, a ratio of the braking force is front wheels 2:rear wheels 3=40:60 in the case described above. The braking force distribution line of the characteristic line A is largely away from the ideal braking force distribution line at the constant load and the ideal braking force distribution line at the light load. The braking force distribution line of the characteristic line A corresponds to a braking force distribution line in the case where, in the electric vehicle 1 according to the embodiment, only the regenerative braking occurs when the first clutch 12 is in the released state and the second clutch 14 is in the engaged state.

A characteristic line B indicates a braking force distribution line in the case where the front-rear power distribution ratio is 50:50, where the regenerative braking occurs, and where the mechanical brakes 7 are released. Since the regenerative braking force is distributed according to a radio equal to the front-rear power distribution ratio, a ratio of the braking force is front wheels 2:rear wheels 3=50:50 in the case described above. The braking force distribution line of the characteristic line B is largely away from the ideal braking force distribution line at the constant load and the ideal braking force distribution line at the light load. The braking force distribution line of the characteristic line B corresponds to a braking force distribution line in the case where, in the electric vehicle 1 according to the embodiment, only the regenerative braking occurs when both the first clutch 12 and the second clutch 14 are in the released state, or when the first clutch 12 is in the engaged state and the second clutch 14 is in the released state.

A characteristic line C indicates a braking force distribution line in the case where, in the electric vehicle 1 according to the embodiment, the first clutch 12 is in the half-engaged state, the second clutch 14 is in the engaged state, the regenerative braking occurs, and the mechanical brakes 7 are released. In the case described above, an internal circulation torque to be transmitted through the power transmission path between the first clutch 12 and the second clutch 14 is generated, and the internal circulation torque acts as a braking force. The internal circulation torque is a torque to be absorbed by slipping of the first clutch 12. Further, in the first clutch 12 in which the slipping occurs, a braking torque is transmitted from a wheel having a low rotational speed to a wheel having a high rotational speed. That is, the braking torque is transmitted in a direction opposite to a direction in which a drive torque is transmitted. As a result, according to the braking force distribution line of the characteristic line C, generally, the braking force for the front wheels 2 is moderately larger than the braking force for the rear wheels 3. The braking force distribution line of the characteristic line C is close to the ideal braking force distribution line at the constant load and the ideal braking force distribution line at the light load.

A characteristic line F is a braking force distribution line in the case where the mechanical brakes 7 act without the regenerative braking. In the case described above, since a load is transferred to the front wheels 2 during braking, a braking force larger than that for the rear wheels 3 is generated on the front wheels 2. The characteristic line F has a larger distribution of the braking force to the front wheels 2 than that of the ideal braking force distribution line at the constant load and the ideal braking force distribution line at the light load.

Figure 3:
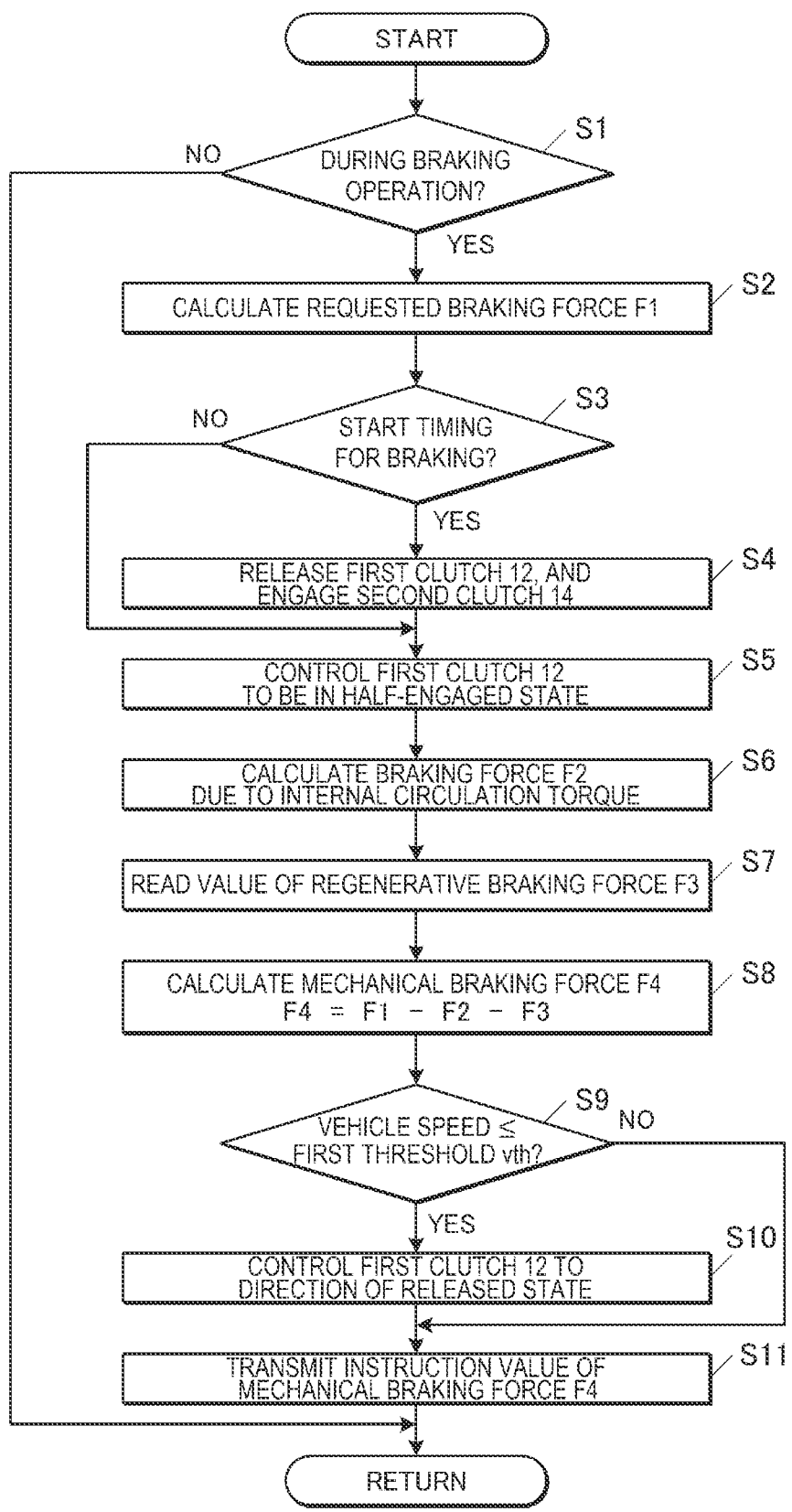
FIG. 3 is a flowchart illustrating a braking process to be executed by a controller.

FIG. 3 is a flowchart illustrating a braking process to be executed by the controller. The controller 21 repeatedly executes a control process at every predetermined control cycle at all times during system operation of the electric vehicle 1.

When the braking process is started, the controller 21 determines whether a braking operation is being performed (step S1). In the case of NO, the controller 21 ends one braking process. On the other hand, in the case of YES, the controller 21 advances the process to the next step.

Next, the controller 21 calculates a requested braking force F1 (step S2). The requested braking force F1 means a braking force requested by a driving operation. The requested braking force F1 may be calculated according to a predetermined method based on a driving operation amount for braking and a vehicle state (such as a vehicle speed).

Then, the controller 21 determines whether a start timing for braking is reached (step S3). When the start timing is reached, the controller 21 switches the first clutch 12 to the released state and the second clutch 14 to the engaged state (step S4), and then advances the process to step S5. At this timing, if the first clutch 12 is already in the released state and the second clutch 14 is already in the engaged state, the controller 21 maintains the states. According to the processes in steps S3 and S4, even if the second clutch 14 is in the released state immediately before the braking process, the second clutch 14 is switched to the engaged state.

On the other hand, if the start timing for braking has passed in step S3, the controller 21 directly advances the process to the next step S5.

After the process is advanced, the controller 21 next controls the first clutch 12 to be in the half-engaged state (step S5). Step S5 is a process to be executed in the braking process of each control cycle in the case where the braking operation is being performed. The controller 21 may perform control of adjusting an engagement amount of the first clutch 12 such that the engagement amount of the first clutch 12 gradually approaches a predetermined engagement amount in the half-engaged state at the time of repeatedly executing the process in step S5 in the plural braking processes.

In the case where the braking forces generated by the mechanical brakes 7 are removed by the process in step S4 and the process in step S5, the distribution of the braking force according to the characteristic line C in FIG. 2 is achieved.

Next, the controller 21 calculates a braking force F2 based on the internal circulation torque generated by setting the first clutch 12 to be in the half-engaged state (step S6). The controller 21 stores, in advance, a data table showing relations among the vehicle state such as a vehicle speed and a vehicle weight, the engagement amount of the first clutch 12, and the braking force F2 based on the internal circulation torque, and can calculate the braking force F2 using the data table. The data table may be formed by a test or a simulation, and may be stored in the controller 21 in advance.

Next, the controller 21 reads a current regenerative braking force F3 from the traveling control unit 24 (step S7). In a control process different from the braking process in FIG. 3, the traveling control unit 24 cooperates with the battery management unit 23 and determines the regenerative braking force F3 depending on the requested braking force and a state of the battery 4, and causes the electric motor 6 to perform a regenerative operation so as to obtain the regenerative braking force F3.

Next, the controller 21 calculates a mechanical braking force F4 to be generated in the mechanical brakes 7 using the following equation (1) (step S8).

$$F4=F1-F2-F3 \tag{1}$$

The calculation in step S8 may be executed using map data.

Next, the controller 21 determines whether the vehicle speed becomes equal to or lower than a first threshold vth that indicates a state before the stop of the vehicle (step S9). The first threshold vth may be set to a value for determining an ultra-low speed before the stop of the vehicle, and the first threshold vth may be a fixed value or may be a value that varies depending on a vehicle state or the like. The value of the ultra-low speed may be any value in the range of 1 [km/h] to 10 [km/h], for example.

In the case where a determination result in step S9 is NO, the controller 21 outputs an instruction value to the traveling control unit 24 so as to generate the mechanical braking force F4 calculated in step S8 (step S11). According to the output, the mechanical brakes 7 operate and the mechanical braking force F4 is generated.

Then, the controller 21 ends one braking process and repeats the process from step S1 again in the next control cycle.

On the other hand, in the case where the determination result in step S9 is YES, the controller 21 controls the first clutch 12 to a direction in which the first clutch 12 is in the released state from the half-engaged state (step S10). Step S10 is a process that is executed in the braking process of each control cycle until the vehicle speed becomes the ultra-low speed before the stop of the vehicle and a braking operation is canceled. The controller 21 may execute control of adjusting an engagement amount of the first clutch 12 such that the engagement amount of the first clutch 12 is gradually reduced and the first clutch 12 is finally in the released state at the time of repeatedly executing the process in step S10 in the plural braking processes.

Thereafter, the controller 21 executes the process in step S11 described above and ends one braking process. Then, in the next control cycle, the process from step S1 is repeated again.

A program for the braking process described above is stored in a non-transitory computer readable medium such as the storage 21*a* of the controller 21. The controller 21 may be configured to read the program stored in a portable non-transitory computer readable medium and execute the program. The portable non-transitory computer readable medium may store the program for the braking process described above.

Figure 4:
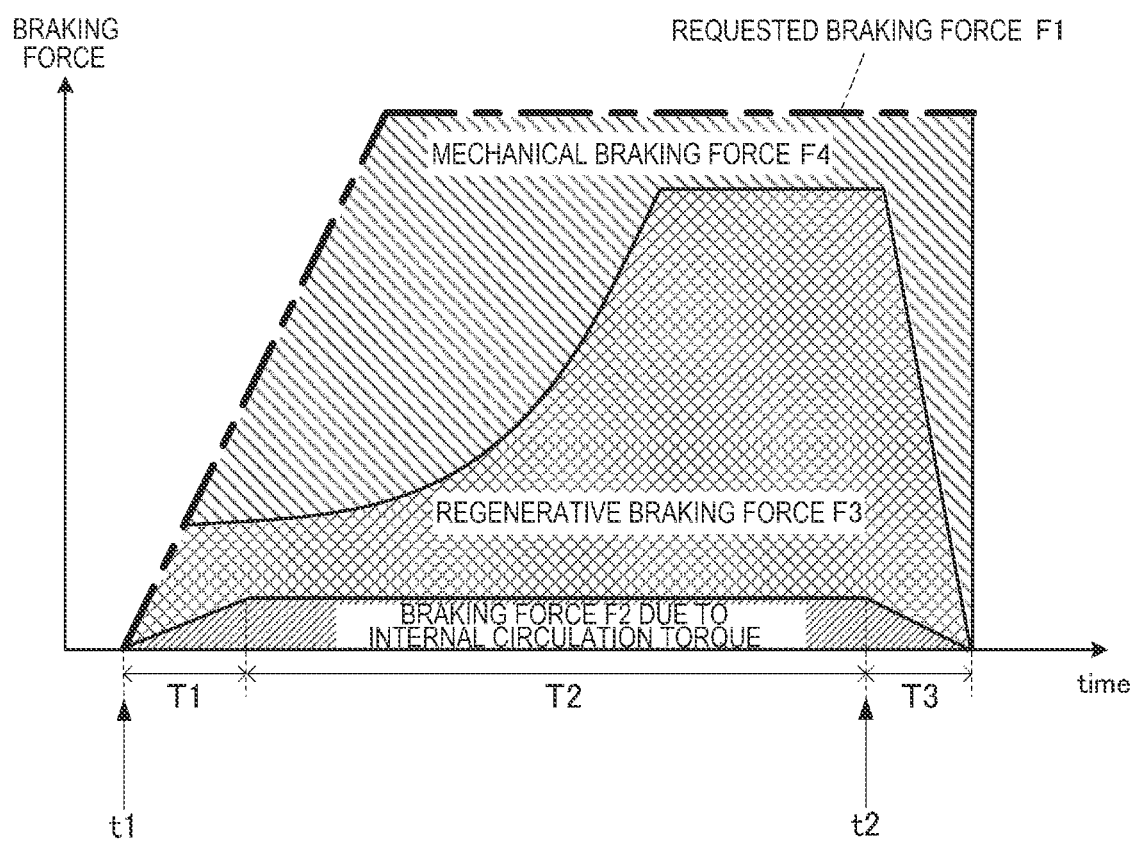
FIG. 4 is a time chart illustrating an example of an operation during braking of the electric vehicle.

FIG. 4 is a time chart illustrating an example of an operation during braking of the electric vehicle. In the time chart, an initial period T1 corresponds to a period during which the first clutch 12 is gradually increased in the engagement amount toward the predetermined half-engaged state by the process in step S5 in FIG. 3. A latter period T3 corresponds to a period during which the first clutch 12 is gradually decreased in the engagement amount toward the released state by the process in step S10 in FIG. 3.

According to the braking process described above, the regenerative braking force F3, the mechanical braking force F4, and the braking force F2 based on the internal circulation torque are generated based on the driving operation for braking such that the total braking force becomes equal to the requested braking force F1.

Further, in a middle period T2 of a braking period, the first clutch 12 is in the half-engaged state and the second clutch 14 is in the engaged state, whereby the regenerative braking force F3 and the braking force F2 based on the internal circulation torque in these states can be obtained. A braking force "F2+F3" is assigned to the front wheels 2 and the rear wheels 3 according to a distribution ratio close to the ideal braking force distribution line at the constant load and the ideal braking force distribution line at the light load, as indicated by the characteristic line C in FIG. 2. Therefore, even when the regenerative braking force F3 accounts for a large ratio of the requested braking force F1, an ideal front-rear braking force distribution can be attained, and a stable vehicle behavior during braking can be achieved.

The ratio between the regenerative braking force F3 and the mechanical braking force F4 varies depending on other factors different from the braking operation, such as a remaining charge amount of the battery 4. For example, since charging of the battery 4 is possible in the first half of the braking period, the ratio of the regenerative braking force F3 may be large, and the ratio of the mechanical braking force F4 may be small. Thereafter, in the second half of the braking period, the remaining charge amount of the battery 4 increases, the ratio of the regenerative braking force F3 may decrease, and the ratio of the mechanical braking force F4 may increase.

Here, unlike the case in FIG. 4, a case will be examined where the regenerative braking force F3 accounts for a large ratio in the first half of the braking period, and then, the mechanical braking force F4 accounts for a large ratio. In this case, unlike the embodiment, it is assumed that the front-rear power distribution ratio of regenerative braking is front wheels 2:rear wheels 3=40:60, and regarding a front-rear mechanical braking distribution, the front-rear power distribution ratio to the front wheels is large. In this configuration, prior to and subsequent to a change in the ratio of the regenerative braking force, the front-rear power distribution ratio of braking force suddenly changes from a case where the front-rear power distribution ratio to the rear wheels is large to a case where the front-rear power distribution ratio to the front wheels is large. Such a sudden change in the front-rear distribution is likely to influence the vehicle behavior on a road surface having a low friction resistance. However, in the embodiment, in at least a part of a period in which both the regenerative braking force and the mechanical braking force are applied, the controller 21 controls the first clutch 12 to be in the half-engaged state and controls the second clutch 14 to be in the engaged state. Therefore, even when there is a change from a period during which the regenerative braking force accounts for a large ratio to a period during which the mechanical braking force accounts for a large ratio during the control, the front-rear braking force distribution does not suddenly change largely. Thus, the stable vehicle behavior can be achieved.

Further, according to the braking process, in the initial period T1 of the braking period, the second clutch 14 is temporarily switched to the engaged state and the first clutch 12 is temporarily switched to the released state at a start timing t1, and then, the first clutch 12 is switched to the half-engaged state. At the start timing t1 for braking, since the second clutch 14 is in the engaged state and the first clutch 12 is in the released state, a front-rear ratio of the regenerative braking force F3 is rear wheels 3>front wheels 2 for just a short time. By distributing a relatively large braking force to the rear wheels 3 for just a short time at an initial stage of braking in this manner, the whole vehicle body including a rear side of a vehicle body sinks, and a more stable vehicle behavior can be achieved in the subsequent braking.

Further, according to the braking process, in the initial period T1 of the braking period, the first clutch 12 is gradually increased in the engagement amount and switched to the predetermined half-engaged state. In this manner, according to the control of gradually changing the engagement amount, the sudden change in the front-rear power distribution ratio is reduced, and the stable vehicle behavior can be achieved during this time.

Further, according to the control process, the first clutch 12 is released in the latter period T3 of the braking period, that is, after a timing t2 at which the vehicle speed becomes equal to or lower than the first threshold vth. When the first clutch 12 is in the half-engaged state, the braking force F2 based on the internal circulation torque is applied, and therefore, a shock is likely to occur immediately before the stop of the electric vehicle 1. In the embodiment, the occurrence of the shock can be reduced.

Further, according to the control process, in the latter period T3 of the braking period, the first clutch 12 is gradually decreased in the engagement amount and becomes in the released state. In this manner, according to the control of gradually changing the engagement amount, the sudden change in the front-rear power distribution ratio is reduced, and the stable vehicle behavior can be achieved during this time.

The above describes the embodiment of the disclosure. However, the disclosure is not limited to the above embodiment. For example, in the above embodiment, the electric vehicle provided with the electric motor as a power source for traveling has been described. However, in addition to the electric motor serving as the power source for traveling, the electric vehicle may include other power sources such as an engine that is an internal combustion engine. Although an example of the power distribution mechanism has been described in detail in the above embodiment, other configurations may be applied as long as the same power distribution is possible in the configurations. Further, in the embodiment, it is described that the controller 21 executes the control of setting the second clutch 14 to be in the engaged state and setting the first clutch 12 to be in the substantially released state during the short time indicated by the start timing t1 for braking so as to generate the regenerative braking, the control of gradually setting the first clutch 12 to be in the half-engaged state during the initial period T1 of the braking period, the control of setting the first clutch 12 to be in the released state during the latter period T3 of the braking period, and the control of gradually setting the first clutch 12 to be in the released state during the latter period T3 of the braking period. However, the above controls may be selected freely, and the above controls may be omitted. Other details described in the embodiment may be changed as appropriate without departing from the subject matter of the disclosure.

According to the disclosure, it is possible to distribute power in a distribution ratio at which the power for the rear wheels is larger than the power for the front wheels, and it is possible to attain a stable vehicle behavior during braking.

The invention claimed is:
1. A power distribution apparatus for an electric vehicle, the electric vehicle comprising front wheels, rear wheels, an electric motor configured to output power for traveling, and a mechanical brake configured to apply a braking force to at least the front wheels, the power distribution apparatus comprising:

a power distribution mechanism configured to distribute the power output from the electric motor to the front wheels and the rear wheels; and a controller configured to control the power distribution mechanism, wherein the power distribution mechanism comprises a first clutch configured to fix a power distribution ratio during straight traveling of the electric vehicle to a first distribution ratio, and a second clutch configured to fix the power distribution ratio during the straight traveling to a second distribution ratio, the second distribution ratio is a distribution ratio at which first power distributed to the rear wheels is larger than second power distributed to the front wheels, the first distribution ratio is closer to a distribution ratio at which the first power and the second power are equal as compared to the second distribution ratio, and the controller is configured to set the second clutch to an engaged state and sets the first clutch to a half-engaged state during regenerative braking of the electric vehicle.

2. The power distribution apparatus for the electric vehicle according to claim 1, wherein the controller is configured to set the second clutch to the engaged state and set the first clutch to the half-engaged state in at least a part of a period during which both a regenerative braking force generated by the electric motor and a mechanical braking force generated by the mechanical brake are applied.

3. The power distribution apparatus for the electric vehicle according to claim 1, wherein the controller is configured to switch the second clutch to the engaged state at a start timing for braking of the electric vehicle, and then set the first clutch to the half-engaged state.

4. The power distribution apparatus for the electric vehicle according to claim 2, wherein the controller is configured to switch the second clutch to the engaged state at a start timing for braking of the electric vehicle, and then set the first clutch to the half-engaged state.

5. The power distribution apparatus for the electric vehicle according to claim 1, wherein the controller is configured to switch the first clutch from the half-engaged state to a released state when a speed of the electric vehicle becomes equal to or lower than a first threshold during a braking period of the electric vehicle.

6. The power distribution apparatus for the electric vehicle according to claim 2, wherein the controller is configured to switch the first clutch from the half-engaged state to a released state when a speed of the electric vehicle becomes equal to or lower than a first threshold during a braking period of the electric vehicle.

7. The power distribution apparatus for the electric vehicle according to claim 3, wherein the controller is configured to switch the first clutch from the half-engaged state to a released state when a speed of the electric vehicle becomes equal to or lower than a first threshold during a braking period of the electric vehicle.

8. The power distribution apparatus for the electric vehicle according to claim 4, wherein the controller is configured to switch the first clutch from the half-engaged state to a released state when a speed of the electric vehicle becomes equal to or lower than a first threshold during a braking period of the electric vehicle.

9. The power distribution apparatus for the electric vehicle according to claim 5, wherein the controller is configured to calculate a first braking force based on an internal circulation torque of the power distribution mechanism, the controller is configured to calculate a second braking force requested for the mechanical brake based on a requested braking force based on a driving operation of a driver who drives the electric vehicle, the regenerative braking force generated by the electric motor, and the first braking force, and the controller is configured to operate the mechanical brake according to the calculated second braking force.

10. The power distribution apparatus for the electric vehicle according to claim 6, wherein the controller is configured to calculate a first braking force based on an internal circulation torque of the power distribution mechanism, the controller is configured to calculate a second braking force requested for the mechanical brake based on a requested braking force based on a driving operation of a driver who drives the electric vehicle, the regenerative braking force generated by the electric motor, and the first braking force, and the controller is configured to operate the mechanical brake according to the calculated second braking force.

11. The power distribution apparatus for the electric vehicle according to claim 7, wherein the controller is configured to calculate a first braking force based on an internal circulation torque of the power distribution mechanism, the controller is configured to calculate a second braking force requested for the mechanical brake based on a requested braking force based on a driving operation of a driver who drives the electric vehicle, the regenerative braking force generated by the electric motor, and the first braking force, and the controller is configured to operate the mechanical brake according to the calculated second braking force.

12. The power distribution apparatus for the electric vehicle according to claim 8, wherein the controller is configured to calculate a first braking force based on an internal circulation torque of the power distribution mechanism, the controller is configured to calculate a second braking force requested for the mechanical brake based on a requested braking force based on a driving operation of a driver who drives the electric vehicle, the regenerative braking force generated by the electric motor, and the first braking force, and the controller is configured to operate the mechanical brake according to the calculated second braking force.

\* \* \* \* \*